United States Patent [19]

Fonteneau et al.

[11] Patent Number: 4,597,974

[45] Date of Patent: Jul. 1, 1986

[54] SAUCE AND GRAVY COMPOSITIONS

[75] Inventors: Jean L. Fonteneau, Le Boupere; Jean P. Germon, Pouzauges, both of France

[73] Assignee: Fleury Michon, Pouzauges, France

[21] Appl. No.: 652,406

[22] Filed: Sep. 20, 1984

[51] Int. Cl.[4] .................... A23L 1/31; A23L 1/39; A23L 1/195

[52] U.S. Cl. ................... 426/129; 426/589; 426/578; 426/574; 426/412; 426/643; 426/644

[58] Field of Search ............ 426/589, 578, 658, 438, 426/409, 472, 641, 643, 644, 654, 129, 112, 113, 805, 574

[56] References Cited

U.S. PATENT DOCUMENTS

| | | | |
|---|---|---|---|
| 2,820,709 | 1/1958 | Schack et al. | 99/108 |
| 3,132,029 | 5/1964 | Beck | 99/174 |
| 3,266,908 | 8/1966 | Allen, Jr. | 426/655 |
| 3,573,067 | 3/1971 | Shults | 99/157 |
| 3,587,203 | 6/1971 | Miles | 53/112 |
| 3,597,228 | 8/1971 | Jeppson et al. | 426/438 |
| 3,598,614 | 8/1971 | Hsu | 426/589 |
| 3,634,104 | 1/1972 | Kaplow et al. | 99/204 |
| 3,681,094 | 8/1972 | Rogers et al. | 426/589 |
| 3,748,146 | 7/1973 | Anderson et al. | 99/107 |
| 3,836,685 | 9/1974 | Schara et al. | 426/805 |
| 3,843,815 | 10/1974 | Reesman | 426/805 |
| 4,002,773 | 1/1977 | Entenmann | 426/302 |
| 4,120,984 | 10/1978 | Richardson et al. | 426/412 |
| 4,206,239 | 6/1980 | Horner | 426/92 |
| 4,214,013 | 7/1980 | Hirahara | 426/629 |
| 4,291,066 | 9/1981 | Anema et al. | 426/589 |
| 4,415,599 | 11/1983 | Bos | 426/578 |

*Primary Examiner*—Jeanette Hunter
*Attorney, Agent, or Firm*—Pennie & Edmonds

[57] ABSTRACT

Edible sauce and gravy compositions are formulated incorporating as an essential ingredient a combination of rice starch and carob-bean flour, to give the compositions desirable thickness, smoothness and stability characteristics. A method for preparing such compositions is disclosed. A process for preparing already-cooked, packaged, meat or fish-in-sauce type food products utilizing the formulated sauce and gravy compositions is also disclosed.

39 Claims, 3 Drawing Figures

SAUCE AND GRAVY COMPOSITIONS

FIELD OF THE INVENTION

This invention relates generally to tne formulation of novel sauce and gravy compositions. More particularly, this invention relates to such sauces and gravies derived from meat or fish stock or utilizing a wine and/or other liquid base and incorporating a novel combination of natural ingredients to impart the proper thickness, smoothness and stability. These sauces and gravies may be packaged separately and so vended for use by the consumer to embellish meat or fish dishes prepared in such manner as not to yield a sauce or gravy, such as grilled meats, or they may be used in the preparation of meat or fish-in-sauce or gravy precooked, packaged convenience food products in individual or multiple size portions which can be stored for long periods of time under refrigeration and which can be quickly and easily reheated for final serving. This invention also relates to a method for preparing such food products.

BACKGROUND OF THE INVENTION

For many years, those skilled in the art of food preparation, particularly in the formulation of sauces and gravies, especially for use in packaged, convenience type, meat or fish-in-sauce or gravy food products, have sought to develop sauces and gravies possessing certain desirable properties. They have also sought to overcome or prevent the occurrence of certain specific problems arising in the preparation of and during the course of storage of products utilizing such compositions.

Such sauces and gravies desirably have the properties of thickness, smoothness, resistance to thermal shock and stability during storage. Resistance to thermal shock is evidenced by maintenance of consistency during variations in temperature which can range from hot to cold and back to hot during the course of preparation, storage and final serving. Stability is measured by the maintenance of aesthetic appeal and the non-occurrence of such phenomena as fat-cap formation and gel formation in the combined meat-in-sauce packaged food product during preparation or over long periods of time during the storage phase.

Customarily, modified starches, gelatin and gums such as carragheenin extract have been some of the ingredients used as thickening agents.

Thus, U.S. Pat. No. 3,598,614 discloses the use of a mixed starch, mixed starch plus gelatin or a mixture of agar and gelatin as a thickener for liquid soy sauce. The mixed starches, one of which must contain amylopectin and the other, both amylose and amylopectin, are typified by a mixture of "glutinous" rice starch or "waxy" corn starch with tapioca, corn, potato or "common" rice starches. Glutinous rice starch is also commonly known as "waxy" or "sweet" rice "flour". Where the starch mixture is used as the thickener, the final thickened soy sauce contains from about 3 to 15% by weight of the starch mixture which is made up from about 25 to 50% of the amylopectin-containing ingredient and from about 75 to 50% of the amylose/amylopectin-containing ingredient. Where the mixed starch is used as the thickener, it is thus evident that a high proportion of that mixture must be used to attain the desired degree of thickness to cause the thickened sauce of that invention to adhere to the food onto which it is applied and not run-off.

Similarly, U.S. Pat. No. 3,266,908 discloses a process for preparing concentrated poultry sauce or gravy compositions in which rice flour is used as a thickening agent. The products of that invention, however, contain a substantial percentage of actual poultry meat or poultry by-products and may be packaged in dry powder form for later reconstitution with water or milk, as a frozen semi-liquid or as canned gravies.

U.S. Pat. No. 3,681,094 requires the use of gelatin in the gravy mixture to give it a semi-rigid rubbery consistency necessary to support the solid phase food according to the packaging scheme of that invention.

The use of thickening agents alone, however, is not enough to achieve the unctuousness or smoothness characteristic of the sauces prepared by the great chefs. Moreover, the consistency of such sauces varies greatly with temperature. This lack of thermal stability and resistance to thermally induced shocks typically causes thermal decomposition or aesthetic changes which are an unfavorable factor from the perspective of consumer acceptability.

The food processing industry has also recognized the existence of other physical and chemical change producing conditions that may occur during the preparation and/or storage phases of such meat-in-gravy type food products. Typically, the industry has sought to overcome such problems by the inclusion of various additives or preservatives in the product to minimize or prevent these changes from occurring.

Thus, for example, U.S. Pat. No. 3,843,815 discloses the use of an acid additive in a meat-in-gravy product to inhibit the formation of gelatin in the gravy during its preparation and to prevent subsequent gellification of the gravy in the container during storage. Gellification is caused by collagen in the food which has cooked out combining with moisture in the gravy.

Weak acids such as phosphoric, citric, succinic, tartaric, fumaric, adipic, acetic and lactic may be used to prevent the problem from occurring, but care must be taken to control the level of acid used to avoid significantly reducing the pH of the product, which, in turn, would produce other undesirable palatability and/or aesthetic side effects.

Similarly, U.S. Pat. No. 3,836,685 discloses the use of a filler material incorporated with the meat portion of a packaged meat-in-gravy product to prevent migration of fat from the meat upon heating the contents, thereby avoiding the formation of a "fat-cap" or layer of fat at the surface of the contents upon cooling down after cooking.

In short, it can be said that the use of previously known thickening agents alone is insufficient to give the prepared sauces and gravies all the desired qualities and the use of specific additives to overcome various problems that occur in the preparation and storage of food products that incorporate such compositions is at best an expedient measure that often complicates matters by curing one problem but causing others.

The ideal sauce or gravy composition is one that achieves the desired results with the minimum of ingredients not essential to the gustatory aspects of the product. Moreover, it is preferable that such ingredients be "natural", as opposed to synthetic chemical additives.

We have discovered that novel mixtures of two such "natural" ingredients, namely, rice starch and carob-bean flour, when incorporated into sauce and gravy formulations, yield compositions of the highest quality possessing all the desirable gustatory and aesthetic characteristics and demonstrating none of the commonly experienced preparation and/or storage problems.

We have also developed a method for preparing food products utilizing these compositions. Until now, no one has been able to develop a simplified, integrated process for producing both the food and the sauce. Thus, although U.S. Pat. No. 3,597,228 discusses a process for preparing precooked poultry pieces which may be packaged in a reheatable container with any of various sauces, those sauces must either be prepared separately or obtained from another source, already premixed and ready for use, for inclusion in those product embodiments so requiring them. The cooking process disclosed in that invention, moreover, is a somewhat complicated two-step process involving both microwave and hot-oil cooking steps. The second cooking step of that invention is required to give the cooked food the desired aesthetic qualities, especially a "browned" appearance such as results from conventional cooking methods and which is unattainable by microwave cooking alone.

Contrastingly, in the food preparation process of the present invention, we have been able to develop an integrated overall process wherein the novel sauce compositions of this invention can be prepared and utilized together with portions of cooked meat or fish to form convenient, reheatable packaged meat-or-fish-in-sauce products of the highest culinary quality. This process is advantageous in that it allows the simultaneous preparation of both food and sauce in separate but integrable steps, thereby increasing the efficiency of the operation and eliminating any dependence on outside sources of supply for the sauces. The efficiency of our process is further enhanced by the fact that the food cooking operation is simplified to a single step based on conventional cooking means, thus also resulting in products with desirable aesthetic appeal.

SUMMARY OF THE INVENTION

The sauces and gravies (hereinafter "sauces") formulated according to this invention incorporate as essential ingredients a combination of natural rice starch and carob-bean flour which we have discovered imparts to such sauces the desirable thickness, smoothness and resistance to thermal shock properties, without the need for gelatin or other thickening agents.

The "natural" rice starch used in this invention is prepared by grinding to a fine white powder hulled, de-germinated white rice. Such rice starch is contrasted to "glutinous" or "waxy" rice starches which are obtained after further processing of the rice.

The discovery that the use of combinations of natural rice starch and carob-bean flour in the formulation of sauce compositions leads to such sauces having desirable properties has made possible the preparation of meat or fish-in-sauce or gravy (hereinafter "meat-in-sauce") food products utilizing these sauces. Surprisingly, the use of these sauce compositions in such products prevents the occurrence of other problems that have been recognized in the development of such products, without the need for any other additives or special processing steps.

The process for producing meat-in-sauce type precooked, packaged food products according to this invention surprisingly overcomes the preparation and storage problems known in the industry without the need for the inclusion of additives or preservatives in the product, as is customarily done. This is because the use of sauce compositions containing novel combinations of rice starch and carob-flour appears to prevent the occurrence of physical and chemical conditions that cause such problems.

Moreover, the use of such ingredient-containing sauces in the preparation of such food products enables the adoption of certain packaging sequencing steps heretofore found impracticable by other inventors because of the subsequent storage and/or reheating phase problems that resulted.

Thus, according to the food product preparation process of this invention, a packaged meat-in-sauce type food product can be prepared wherein the solid food phase may be placed into the container before addition of the sauce. This directly overcomes the perceived limitation as disclosed in U.S. Pat. No. 3,681,094.

In that invention it was found that preparation of a packaged food product in which the solid phase food is placed in the container first, followed by addition of the sauce or gravy thereto leads to an aesthetically unappealing product. The food products of that invention are not precooked but are cooked for final use only after packaging. It was there found that during cooking, the gravy remained on the top surface of the meat and tended to burn or boil away. The cooked-out juices from the meat were also observed to run to the bottom of the pan and did not mix sufficiently well with the rest of the gravy on top. Moreover, the existence of the gravy on top of the meat prevented it from browning during cooking. In that invention such problems were overcome by reversing the sequence of the packaging with the gravy being introduced into the container prior to the solid phase food. This, in turn, required, and the apparent novelty of that invention disclosed, the essential use of gelatin in the gravy to produce a relatively firm, gellified gravy layer on top of which the solid phase food could be supported.

The process of this invention does not have any such limitations in packaging nor does it require the use of gelatin. The sequence of packaging the food and sauce is not critical and can be performed in any order. This flexibility is a tremendous commercial advantage of this process.

The preferred embodiment of the process of preparing packaged meat-in-sauce products according to this invention incorporates a "food-then-sauce" packaging sequence, thus distinguishing it from the less flexible opposite sequence processes required by others. This flexibility is attributable primarily to the nature and composition of the sauces and gravies used and because of the precooking step utilized in our process. Thus, the difficulties earlier encountered by those practicing the art have been successfully overcome by us without the need to resort to using gelatin with its effects on the aesthetic and taste characteristics of the sauce and without the inconvenience in packaging occasioned by a need to allow the gravy or sauce phase to set to a semi-rigid, rubbery state before addition of the solid phase food.

We have not experienced any problems of sauce boiling away or burning in those instances where the sauce is added to the food since only relatively lower temperatures are required to reheat our product than would be necessary to fully cook the food as must be done in other processes where it is packaged raw or only partially cooked. Moreover, since the food is already cooked according to our invention, it is browned and thus possesses the aesthetic attributes of cooked versus raw food before packaging. Finally, since the sauces of our invention are fully blended to their final consistency before packaging, including intermixing with the cooked-out juices of the food, and are capable of resisting changes in consistency due to thermal changes, there is no problem of inadequate or incomplete mixing of the sauce components in the container.

The food products produced according to the process of this invention and utilizing the novel combination of rice starch and carob bean flour as essential ingredients of the sauce part of the product, are ideally suited for use by large scale commercial and institutional organizations such as airlines, catering services, restaurants, hospitals and schools, where many meals must be compactly stored, quickly prepared and served with a minimum of effort and inconvenience on a frequent and recurring basis. Such products are, of course, equally well suited as a convenience food for use at home.

The food products of this invention possess a number of desirable attributes, such as flexibility in terms of storage conditions, being refrigeratable for long periods of time while retaining the stability of their sauces; compactness and convenience of storage in easily shelved or stacked, sealed, combination container-serving trays; require no further direct handling or preparation of the food except for reheating in the container; speed and convenience in reheating with minimal time required because the foods are already cooked; and flexibility and variety in terms of menu offerings with a wide range of meat and fish in sauce or gravy entrees capable of being so prepared. A further advantage of the food products of this invention and an improvement over previously developed products is the aesthetic appeal of the final packaged product. The food is neatly and eye-appealingly arranged in the serving tray-container, and further, due to its precooked state, is already browned and possesses the visual characteristics of a fully prepared meal ready for serving. The plastic serving tray containers may be embellished with decorations to give the appearance of a serving plate thus further enhancing the consumer appeal of the product.

This contrasts sharply with the method of packaging and presentation of many previously developed meat-in-sauce type packaged food products, particularly those such as disclosed in U.S. Pat. No. 3,132,029 wherein the food is packaged in a flattened plastic pouch. While such products may possess the desirable feature of convenience they are usually only of a common variety and consumers tend to regard them as just that, convenience foods, with the result that often, at least subconsciously, they feel they are consuming a product inferior to a home-cooked or restaurant-prepared meal.

The aesthetic presentation of the food products of this invention, on the other hand, complements the wide variety of dishes, many exotic, which can be prepared according to our invention. We have prepared about 100 varieties of food dishes with their corresponding sauces according to our process.

DETAILED DESCRIPTION OF THE INVENTION

During the course of testing various ingredients to develop sauces and gravies with the desired attributes of thickness and unctuousness, natural rice starch was observed to be the ingredient of choice as the primary thickening agent. Rice starch has the capability of absorbing large quantities of liquid, which property is directly responsible for its utility as a thickener. Moreover, rice starch has excellent emulsifying properties thereby making it especially useful in preparing sauces and gravies since that property enables it to physically interact with the fat used in the formulation thus producing a sauce or gravy of uniform consistency resistant to component separation. Through the preparation of various sauces and gravies with a wide range of pH values, rice starch was observed to be the only ingredient which did not undergo a change in properties with changing pH, especially in the acidic range.

Through the formulation and preparation of various sauces over a range of pH values it became possible to develop a correlation of the optimum weight percent of rice starch to be used in a given recipe as a function of pH. As acidity increases it becomes necessary to increase the amount of rice starch used.

Thus, for a red wine sauce with a pH of 6, rice starch optimally comprises 1.7 weight percent of the overall composition, while for a pork tongue sauce with a pH of 4.5, rice starch is optimally increased to 2.1 weight percent of the overall composition.

Testing of ingredients to give the sauces the desired properties similarly revealed that carob-bean flour is the ingredient of choice to properly bind all the ingredients of the sauce together thereby giving them tremendous smoothness and consistency over a wide temperature range.

Figure 1:
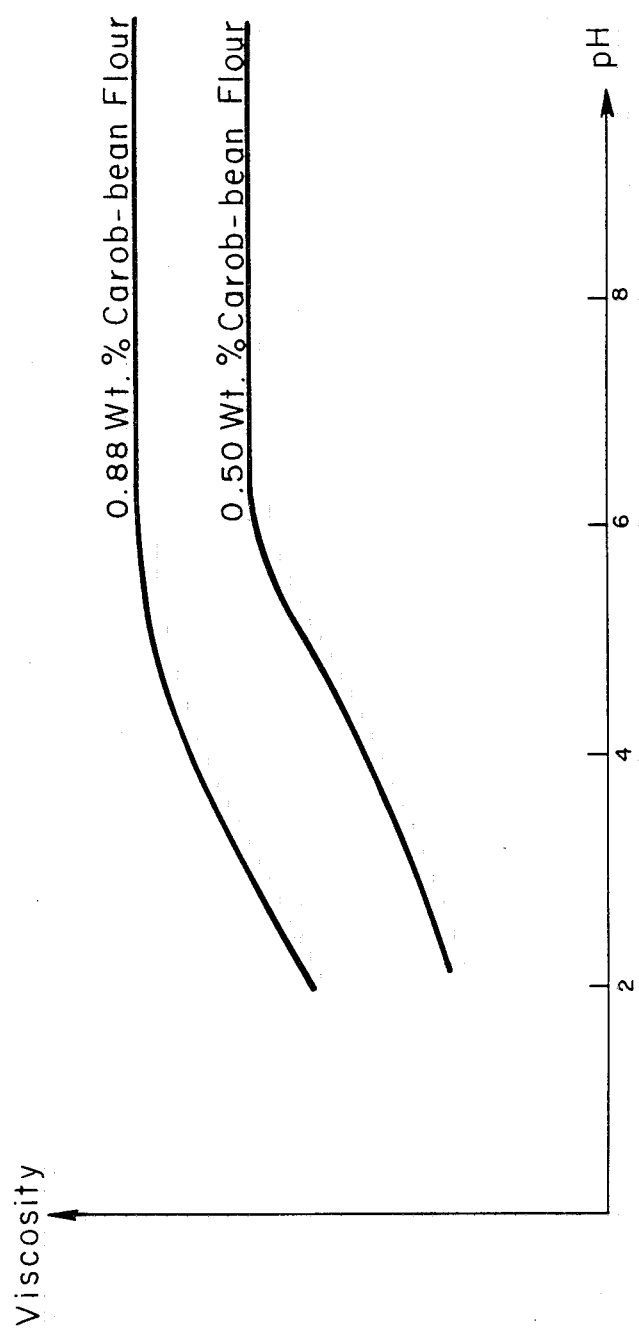
FIG. 1 shows the relationship of sauce viscosity to pH at various carob bean flour levels.

Our testing revealed the existence of a correlation between the viscosity of a sauce at a given pH and the weight percent of carob-bean flour optimally used for a given sauce recipe based on its pH. FIG. 1 shows the relationship of sauce visosity to pH at carob-bean flour levels of 0.5 and 0.88 weight percent of the total sauce composition. Of all ingredients and combinations thereof the use of rice starch and carob-bean flour in essential combination as disclosed in this invention was discovered to yield the most satisfactory sauces.

Finally, by testing sauce and gravy formulations using liquid ingredients, especially the cooked-out juices from meat or fish, having varying water hardness levels, it was observed that an inverse correlation between the viscosity of the final sauce and the hardness of the water existed. Thus, as water hardness increased, the viscosity of the composition decreased. Thus, softened water is preferably used in the preparation of sauces and gravies according to this invention.

Figure 2:
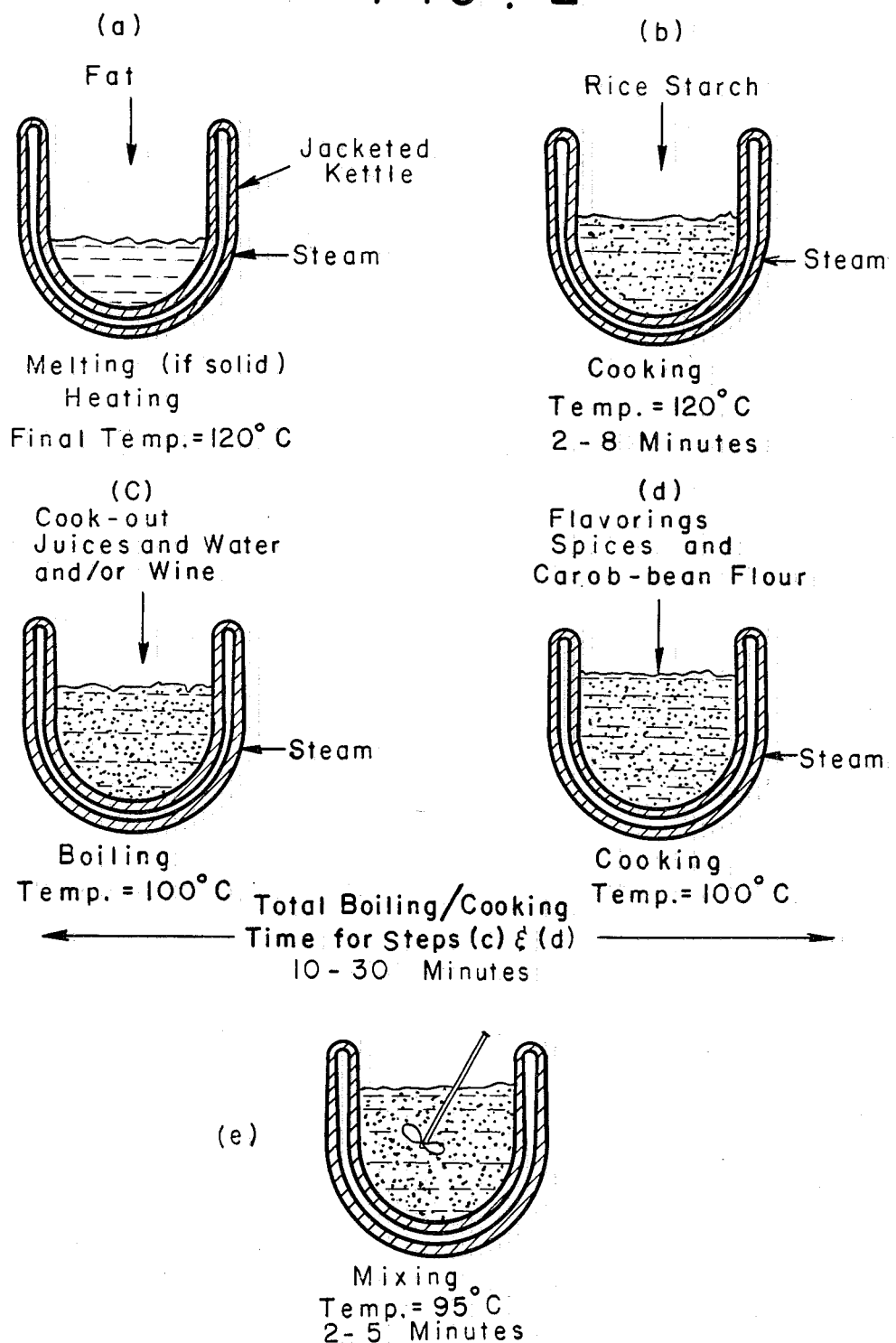
FIG. 2 shows the time-sequence of steps in a method for the preparation of sauces according to this invention, as the steps occur in the sauce preparation vessel.

The sauces of this invention are prepared according to a multi-step operation. FIG. 2 illustrates the time-sequence of processing steps in the method, as the steps occur in the sauce preparation vessel.

A quantity of solid fat such as lard or butter is first melted in a cooking vessel. Alternately, a fat such as heavy cream which is a liquid at room temperature may be used. Mixtures of fats may also be used. The selection of the fat to be used is determined by the nature of the sauce to be prepared. The fat accounts for from 1.5 to 2.5 weight percent of the total sauce composition depending on the particular sauce being prepared.

Preparation of the sauce is preferably done in a "jacketed kettle" type cooking means consisting of a double-walled vessel forming an interior space for cooking and mixing the ingredients, surrounded on the sides and bottom by an exterior enclosed space into which a heating medium such as steam can be injected. Such a means is desirable because it permits good temperature control and helps prevent burning the delicate sauces as might occur were the sauces to be prepared in a vessel in direct contact with an open flame wherein poor temperature control and uneven heating could readily lead to "hot spots" in the vessel wall conducting too much heat to the contents. Alternate devices allowing careful control of the temperature may however also be employed and there is no limitation to the preparation of the sauces in such jacketed kettle type vessels.

The fat is heated to a temperature around 120° C. Rice starch is then added to the hot fat so that the overall ratio of starch to fat is appproximately 50/50 by weight. The rice starch thus also accounts for from 1.5 to 2.5 weight percent of the total sauce composition depending on the particular sauce being prepared. The starch-fat mixture is cooked for several minutes, from 2 to 8 minutes and preferably from 3 to 5 minutes, still at around 120° C.

At this point, the liquid phase cooking medium decanted from the separate cooking of meat or fish is added to the sauce base. This liquid is composed of either hot oil or water depending on the method of cooking the food (i.e. sauteing or boiling, respectively) and also contains the cook-out juices from the meat or fish and any optionally added bits of vegetables added for flavor. Alternatively, if the particular sauce being prepared does not call for meat or fish stock, or additionally if the recipe so calls for, other liquids, particularly wine, vinegar or juices extracted from vegetables such as mushrooms may be added to the sauce base. The total liquid phase materials added at this step account for from 70 to 90 weight percent of the total sauce composition depending on the sauce prepared. The temperature of the cooking ingredients is then reduced to around 100° C.

During this phase of the sauce preparation, the rice starch expands due to the absorption of liquids from the above introduced liquid phase materials, thereby causing the sauce to thicken.

The mixture is brought to a boil, whereupon the remaining ingredients of the sauce composition, consisting of flavorings and spices and carob-bean flour, are added. Carob-bean flour accounts for from 0.3 to 1.0 weight percent of the total sauce composition depending on the sauce prepared. The flavorings and spices constitute the otherwise unaccounted for balance to bring the total of all the ingredients to 100 percent. The final mixture is then allowed to cook at a temperature ranging from 90° C. to 100° C., preferably from 95° C. to 100° C., for an additional period of time.

The total cooking time from the point of addition of the decanted liquid phase from the food cooking operation and/or other liquids, to addition of the remaining ingredients and completion of the cooking, ranges from 10 minutes to 30 minutes depending on the nature of the sauce being prepared.

After cooking is completed, the final sauce in the cooking vessel is energetically mixed, such as with an electric mixer for several minutes, ranging from 2 minutes to 5 minutes, depending on the type of sauce, to asssure homogenous mixing of all ingredients and even distribution of the carob-bean flour binder.

The finalized sauces, at around 80° C., are pumped from the preparation vessel to sauce dosing machines and, where prepared as part of an integrated meat-in-sauce packaged convenience food product, as further described below, are utilized for the sauce dispensing operation, or alternately, the sauces may be separately packaged as for retail sale. Separately packaged sauce must be pasteurized according to the process step more fully described below.

Figure 3:
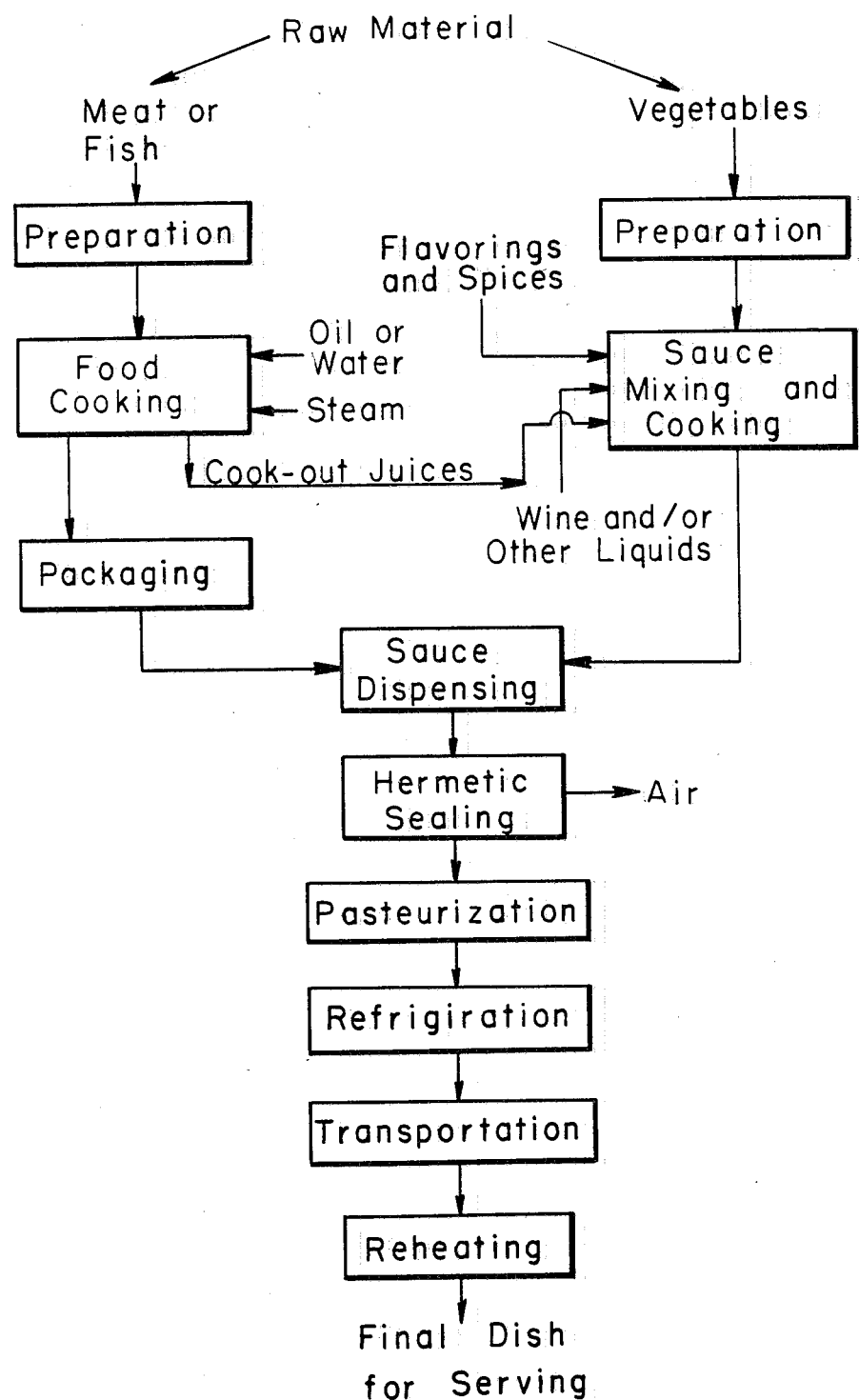
FIG. 3 shows the flow-sequence of steps in an integrated process for the preparation of packaged meat-in-sauce convenience type food products.

Food products of this invention, utilizing sauces prepared as described above are produced according to a multi-step process as follows. FIG. 3 illustrates the flow-sequence of processing steps.

Raw solid food ingredients for the dish to be prepared, such as meat or fish and vegetables, are obtained in bulk in a fresh or frozen state. Preferably fresh raw materials are used to yield final food products of the highest culinary quality. Frozen raw materials may however also be used, and yield prepared dishes of acceptably high quality.

Where fresh raw materials are used, they are initially prepared by cleaning, washing, and, as appropriate, trimming of excess fat, deboning and removing of inedible or unwanted portions such as stems or leaves. Alternately, where frozen raw materials are used, initial preparation consists of thawing the ingredients.

The raw solid food ingredients, in condition for further processing, are then cut into smaller pieces or chunks for cooking. These smaller pieces are of uniform size and weight.

Cooking of the raw food is accomplished by conventional thermal methods, either by cooking in boiling water or by sauteing in hot oil. The pieces or chunks of meat or fish are placed in an appropriate cooking vessel containing either water or oil depending on the method of cooking to be used. Small pieces of vegetables such as onions and/or carrots may be added for additional flavor. The food is then cooked until the desired degree of "doneness" is achieved. Cooking by sauteing in hot oil is performed at a temperature around 180° C. Cooking in boiling water is performed at a temperature around 100° C. Cooking times, which depend on the method and the nature of the dish being prepared, range from 7 minutes to 2 hours.

After cooking has been completed, the cooked meat or fish is separated from the liquid phase. The remaining liquid phase consists of the water or oil cooking medium which now contains the cook-out juices from the meat or fish. The liquid also contains any optionally added vegetables. This liquid is utilized in the preparation of the sauces, as described above.

The cooked meat or fish, free from surrounding moisture, is transferred to containers, which also serve as a reheating dish and serving tray. We have found high-density polyethylene to be a material of choice for the fabrication of these containers although other heat-resistant plastics or other materials may be used. Based on measured "after-cooking" weights of the small pieces or chunks of meat or fish, the containers may be filled with a known weight of food to provide either individual or multiple serving portions. We have prepared both single-sized servings as well as containers with portions for serving 8, however this is not a limitation on the range of sizes that can be packed.

The solid food packed containers are then taken to a sauce dosing machine where sauce is added to the container. The sauce added to the containers is at a temperature around 80° C. It is desirable that the sauce cover and flow around the food in the container, evenly distributing itself throughout.

The sauce dosing machine is filled with the appropriate sauce for the dish being prepared as received from the sauce preparation vessel. The sauce dosing machine is of a type known in the food processing industry and readily commercially available. Such machines are designed to uniformly dispense a pre-measured quantity of contents from a small diameter opening or spout upon the pressing of a button, release of a lever or some such action. These machines are also readily adaptable for use on an automated filling line.

Although we have found that in most instances the preferred sequence is to place the solid food portions in the containers first and add the measured amount of sauce thereto, the scope of the process of this invention, as mentioned above, is not limited to this procedure. Alternately, under certain circumstances it may be desirable to reverse the sequence and first dispense the sauce into the containers, followed by placement of the portions of meat or fish. The former method is preferable where the sauce is of low to medium viscosity, to avoid splattering of the sauce as might occur if the solid food were subsequently added. This prevents the creation of a messy, unaesthetic final package. The alternate method is more suited to situations where a thick sauce of hign viscosity is used. Such sauces are more resistant to the impact of solid food subsequently being placed into the container and are less likely to splatter and create a messy package.

Final garnishing ingredients such as cooked bacon, cooked mushrooms and so forth may optionally be added at this point.

The food and sauce filled containers are then taken to a combined wrapping/sealing and air evacuation machine. The containers are placed in the chamber of the machine and are first covered with a plastic film. The film may be dispensed and cut from a continuous roll. The film is heat-sealed to the plastic container at around 150° C.

We have found that a preferred material for the container covering is a bi-layered plastic film composed of an interiorly facing layer of polyamide bonded to an exteriorly facing layer of medium-density polyethylene. Such a film provides on ideal air and moisture barrier between the container contents and the environment.

The chamber of the machine is then closed and air is pumped from the containers via a small opening in the containers. The containers are evacuated at a lowered pressure in the chamber of from 400 to 600 millimeters of mercury. After the desired vacuum conditions are attained, the small openings in the containers are mechanically sealed to prevent air from being reintroduced into the containers. Creation of a vacuum in the containers helps retard oxidation and spoilage of the food during storage. The wrapping/sealing and air evacuation machine is of a type commonly used in the food processing industry. Such machines are readily-commercially available.

The sealed, hermetically-packed containers are then taken to a pasteurizing unit. The containers are there heated under carefully controlled conditions of temperature to sterilize the package and its contents. Any bacteria on the exterior of the package as well as any in the food which might cause spoilage of the food are thermally destroyed. The packages are pasteurized by immersion in a hot water bath. The bath temperature and duration of the pasteurizing step are carefully controlled. The conditions are also a function of the type of food being pasteurized. Conditions have been optimized for a wide range of food dishes. The range of hot water bath temperatures ranges from approximately 90° C. to 106° C. The corresponding temperatures attained in the food itself range from 80° C. to 95° C., respectively. The range of pasteurization times ranges from 30 minutes to 2 hours. These conditions are sufficiently stringent to destroy any bacteria without affecting the state of the food contents. It is important to ensure proper pasteurization to destroy any bacteria while avoiding too-high temperatures and too-long exposures which may overcook the already cooked food, and spoil its appearance and/or taste.

After pasteurization has been completed, the hot water bath in the unit is drained and replaced with a cool water bath to lower the temperature of the container packages as a preliminary refrigeration step. The cool water bath, at about 15° C. is maintained for about 30 to 45 minutes. The temperature of the food is reduced to about 30° C.

The cooled containers are then removed from the pasteurization unit and sent to a chilled room maintained at about 0° C., for refrigerated storage. The product packages attain a temperature of around 4° C. while in refrigerated storage.

The final product packages are distributed to the commercial or institutional user or retailer by refrigerated transport at a temperature not to exceed 7° C.

The "shelf-life" of the final product from storage in the refrigerated room to final consumption is about 4 weeks for fish dishes and about 8 weeks for meat dishes.

The product packages may be reheated for ultimate serving by the commercial or institutional user or retail consumer either by immersion in boiling water, at 100° C., or by microwave heating. The food may also be reheated in a conventional oven at less than 250° C. This alternate method can be utilized with the food in the packaging tray, however, only if a non-plastic or sufficiently thermally resistant plastic container has been used. Food products packed in the standard high-density polyethylene containers may not be oven reheated.

Reheating times are a function of the method used and of the size of the portion. For a single size portion typical reheating times are 10 minutes for water-boiling and 3 minutes for microwave heating. For an 8 portion package, reheating time is typically 30 minutes for water-boiling and 20 minutes for microwave heating.

The food product preparation process of this invention is readily adaptable to either a batch or a continuous process. A fully automated continuous processing scheme can easily be developed to produce large numbers of food product units such as is required by large-scale institutional users.

EXAMPLES

The following examples serve to illustrate several embodiments of the aspects of this invention. It is understood that the scope of the invention is, however, not limited to these examples.

EXAMPLE 1

Food and sauce for approximately 100 portions of Beef Bourguignon were prepared using the following ingredients in the amounts and percentages indicated.

Food Cooking

| Beef (raw, in cubes of 54 grams each) | 17.000 kilograms |
|---|---|
| Water | 12.000 liters |
| Red Wine | 8.000 liters |
| Tomato | 0.275 kilograms |

The beef was browned in lard in a frying pan then cooked by simmering at the boiling point for two hours in the water and wine with the tomato.

After cooking, the meat was removed from the liquids and tomato. The liquids were decanted for use in the preparation of the sauce.

Sauce Preparation

Approximately 20 kilograms of sauce were prepared utilizing the lard and decanted liquids from the meat cooking.

| Ingredient | Weight Percent |
|---|---|
| Lard | 1.733 |
| Rice Starch | 1.733 |
| Cooking Juices, Water and Red Wine | 80.607 |
| Vegetables | 4.210 |
| Flavorings and Spices | 11.222 |
| Carob-Bean Flour | 0.495 |
| | 100.000 |

The sauce was prepared according to the method of this invention as fully described in the specification.

Product Packaging

Individual size portions of a Beef Bourguignon meat-in-sauce food product were packaged as follows:

| Cooked beef, 3 pieces | 0.085 kilograms |
|---|---|
| Sauce | 0.135 kilograms |
| Bacon bits | 0.010 kilograms |
| Mushrooms | 0.010 kilograms |
| Total Net Weight of Food | 0.240 kilograms |

EURO BQ 26 containers were used to package the product. The packages were pasteurized at 106° C. for 2 hours.

EXAMPLE 2

Food and sauce for approximately 100 portions of Stewed Chicken Bordelaise were prepared using the following ingredients in the amounts and percentages indicated.

Food Cooking

| Chicken thighs and legs | 20.000 kilograms |
|---|---|

(approximately 190 grams each, cut in two pieces from de-boned chicken carcasses of appoximately 1 kilogram).

The chicken parts were browned with lard in a frying pan, then cooked in boiling water for 15 minutes. The parts were then drained and cooked with the remainder of the chicken carcasses for one hour.

Sauce Preparation

Approximately 13 kilograms of sauce were prepared utilizing the lard and decanted liquids from the meat cooking.

| Ingredient | Weight Percent |
|---|---|
| Lard | 1.602 |
| Rice Starch | 1.602 |
| Cooking Juices | 38.712 |
| Red Wine | 38.712 |
| Vegetables | 3.476 |
| Flavorings and Spices | 15.362 |
| Carob-Bean Flour | 0.534 |
| | 100.000 |

The sauce was prepared according to the method of this invention as fully described in the specification.

Product Packaging

Individual size portions of a Stewed Chicken Bordelaise mean-in-sauce food product were packaged as follows:

| Cooked chicken, 1 thigh piece and 1 leg piece | 0.135 kilograms |
|---|---|
| Sauce | 0.125 kilograms |
| Bacon bits | 0.200 kilograms |
| Mushrooms | 0.200 kilograms |
| Total Net Weight of Food | 0.300 kilograms |

DYNO 522 containers were used to package the product.

The packages were pasteurized at 106° C. for 1 hour.

EXAMPLE 3

Recipe for a Beurre Blanc (White Butter) Sauce not utilizing cook-out juices from separately cooked meat or fish.

Approximately 100 liters of sauce were prepared according to the following procedure using ingredients in the amounts specified.

Preparation of "Reduction"

| Ingredients | Amount (Liters) |
|---|---|
| White Wine | 6.500 |
| Wine Vinegar | 3.250 |
| Shallots (chopped to 6 mm pieces) | 4.540 |
| Butter | 1.760 |
| | 16.050 |

Cook entire mixture until reduced to 7.355 liters.

Sauce Composition

| Ingredient | Amount (Liters) |
|---|---|
| "Reduction" | 7.355 |
| Butter (1st portion) | 2.140 |
| Rice Starch | 1.300 |
| Thick Fresh Cream | 65.630 |
| Water | 12.540 |
| Butter (2nd portion) | 9.460 |
| Carob-Bean Flour | 0.360 |

-continued

| Ingredient | Amount (Liters) |
| --- | --- |
| Table salt | 0.940 |
| White pepper | 0.130 |
| | 99.855 |

Preparation Procedure (1) Lightly brown the shallots in butter; moisten with white vinegar and reduce.
(2) Drain shallots in strainer.
(3) Separately, make the rice starch/butter mixture combining the rice starch and first portion of butter for the sauce.
(4) Add the water, thickened fresh cream and liquid drained from the shallots.
(5) Add salt and pepper.
(6) Incorporate the second portion of butter for the sauce at a full boil and mix.
(7) Add carob flour while mixing.
(8) Add shallots, mixing with whip.

The sauce ws packed inindividual 0.240 kilogram portions using EURO BQ 26 containers and in multiple portions of 2.250 kilograms using DYNO 501 or MONO BPE 250 containers.

The packages were pasteurized at 90° C. for 40 minutes.

What is claimed is:

1. A sauce or gravy composition comprising:
   a fat in an amount of about 1.5 to 2.5 weight percent;
   at least one liquid of water, oil, meat cook-out juice, fish cook-out juice, wine, vinegar, or vegetable juice in an amount of about 70 to 90 weight percent;
   rice starch in an mount of about 1.5 to 2.5 weight percent;
   carob-bean flour in an amount of about 0.3 to 1 weight percent; and
   at least one flavoring or spice in an amount of about 4 to 26.7 weight percent.

2. The sauce or gravy composition of claim 1 wherein the amounts of fat and rice starch are substantially equal.

3. The sauce or gravy composition of claim 1 wherein the fat is lard, butter, cream, or mixtures thereof.

4. A food product comprising at least one of cooked meat, fish, or vegetable portion and the sauce or gravy composition of claim 1.

5. A packaged food product which comprises the food product of claim 4 inside of a sealed package or sealed container.

6. A method for preparing a sauce or gravy composition which comprises:
   heating about 1.5 to 2.5 parts by weight of a fat to about 120° C.;
   adding about 1.5 to 2.5 parts by weight of rice starch to the heated fat to form a first mixture;
   cooking the first mixture at 120° C.;
   adding about 70 to 90 parts by weight of at least one liquid of water, oil, meat cook-out juice, fish cook-out juice, wine, vinegar or vegetable juice to the first mixture to form a second mixture;
   expanding the rice starch by contact with the liquid so as to thicken the second mixture;
   heating the thickened second mixture to boiling;
   adding about 0.3 to 1 part by weight carob-bean flour and about 4 to 26.7 parts by weight of at least one flavoring or spice to form a third mixture;
   cooking the third mixture for a sufficient time to obtain the desired sauce or gravy; and
   mixing the sauce or gravy to obtain a homogeneous composition.

7. The method of claim 6 wherein the fat and rice starch are present in equal amounts.

8. The method of claim 6 wherein the first mixture is cooked for about 2 to 8 minutes.

9. The method of claim 6 wherein two or more of the liquids are added to the first mixture.

10. The method of claim 6 wherein the liquid includes a portion of the flavoring or spices; while the remainder of the flavoring or spices is added with the carob-bean flour to the boiling second mixture.

11. The method of claim 6 which further comprises reducing the temperature of the second mixture to about 100° C. after adding the liquid.

12. The method of claim 6 wherein the total cooking time from the step where the liquid is added to the step where the desired sauce or gravy is obtained is about 10 to 30 minutes.

13. The method of claim 6 wherein the mixing of the sauce or gravy is accomplished by electric mixing means.

14. A sauce or gravy composition produced by the method of claim 6.

15. A food product comprising at least one of cooked meat, fish, or vegetable portion and the sauce or gravy composition of claim 14.

16. A packaged food product which comprises the food product of claim 15 inside of a sealed package or sealed container.

17. A method for preparing a food product which comprises preparing a food portion of at least one raw meat, fish or vegetable; cooking said food portion; and adding the sauce or gravy composition of claim 1.

18. A food product produced by the method of claim 17.

19. A packaged food product which comprises the food product of claim 18 inside of a sealed package of sealed container.

20. A method for preparing a food product which comprises preparing a food portion of at least one raw meat, fish or vegetable; cooking said food portion; preparing a sauce of gravy according to claim 6; and adding the sauce or gravy to the food portion.

21. A food product produced by the method of claim 20.

22. A packaged food product which comprises the food product of claim 21 inside of a sealed package or sealed container.

23. A method for preparing a packaged food product which comprises preparing a food product according to claim 17; placing a pre-measured quantity of the food product into a package or container; and sealing the package or container.

24. The method of claim 23 wherein the package or container comprises polyethylene.

25. A method for preparing a package food product which comprises:
   preparing at least one raw meat, fish or vegetable food ingredient by cleaning and then removing inedible or unwanted portions of the food ingredient;

cutting the food ingredient to a predetermined size or sizes;

cooking the food ingredient to the desired degree in a water or oil medium;

decanting the water or oil medium to recover cookout juices from the cooked food ingredient;

preparing a sauce or gravy by:

adding about 70 to 90 parts by weight of the cook out juices to a first mixture of about 1.5 to 2.5 parts by weight of a fat and about 1.5 to 2.5 parts by weight of rice starch after the first mixture is cooked at 120° C. to form a second mixture;

expanding the rice starch by contact with the liquid to thicken the second mixture;

heating the thickened second mixture to boiling;

adding about 0.3 to 1 part by weight carob-bean flour and about 4 to 26.7 parts by weight of at least one flavoring or spice to form a third mixture;

cooking the third mixture for a sufficient time to obtain the desired sauce or gravy; and mixing the sauce or gravy to obtain a homogenous composition;

placing predetermined weighed portions of the cooked food ingredient into a package or container;

adding a predetermined quantity of the sauce or gravy to the container;

sealing the package or container to form a sealed packaged food product;

pasteurizing the product to destory any bacteria; and storing the cooled product under refrigerated conditions until subsequent reheating and serving.

26. The method of claim 25 wherein the food ingredients are obtained in a frozen state and are thawed before preparation.

27. The method of claim 25 wherein the food ingredient is cooked by sauteing in hot oil at about 180° C., simmering in boiling water at about 100° C., or combinations therefor.

28. The method of claim 25 wherein the food ingredient is cooked from between 7 minutes to 2 hours.

29. The method of claim 25 wherein the food ingredient is packaged in high-density polyethylene plastic containers covered by heat-sealing with a bi-layered plastic film comprising a layer of polyamide bonded to a layer of medium-density polyethylene; the polyamide side of the film facing the food ingredient.

30. The method of claim 25 wherein the packages or containers are hermetically sealed under vacuum of from 400 to 600 millimeters of mercury.

31. The method according to claim 25 wherein the pasteurization step comprises immersing the sealed packages or containers in a hot-water bath at a temperature ranging from 90° C. to 106° C. and for a time ranging from 30 minutes to 2 hours.

32. The method of claim 25 wherein the packaged products are stored under refrigeration at a temperature of from 0° C. to 7° C. for a time ranging from 4 to 8 weeks.

33. The method of claim 25 wherein the packaged products are reheated by immersion in boiling water or by heating with microwaves.

34. The method of claim 25 wherein all processing steps are fully automated in a continuous production line.

35. A packaged food product produced by the method of claim 25.

36. A method for preparing a packaged food product which comprises:

preparing at least one raw meat, fish or vegetable food ingredient by cleaning and then removing inedible or unwanted portions of the food ingredient;

cutting the food ingredient to a predetermined size or sizes;

cooking the food ingredient to the desired degree in a water or oil medium;

decanting the water or oil medium to recover cookout juices from the cooked food ingredient;

preparing a sauce of gravy by:

adding about 70 to 90 parts by weight of the cook out juices to a first mixture of about 1.5 to 2.5 parts by weight of a fat and about 1.5 to 2.5 parts by weight of rice starch after the first mixture is cooked at 120° C. to form a second mixture;

expanding the rice starch by contact with the liquid to thicken the second mixture;

heating the thickened second mixture to boiling;

adding about 0.3 to 1 part by weight carob-bean flour and about 4 to 26.7 parts by weight of at least one flavoring or spice to form a third mixture;

cooking the third mixture for a sufficient time to obtain the desired sauce or gravy; and mixing the sauce or gravy to obtain a homogenous composition;

adding a predetermined quantity of the sauce or gravy to the container;

placing predetermined weighted portions of the cooked food ingredient into a package or container; sealing the package or container to form a sealed packaged food product;

pasteurizing the product to destory any bacteria; and storing the cooled product under refrigerated conditions until subsequent reheating and serving.

37. A packaged food product produced by the method of claim 36.

38. A method for improving the thickness, smoothness and consistency of a sauce or gravy composition which comprises:

adding rice starch to the composition in an amount sufficient to act as a primary thickening agent; and adding carob-bean flour to the composition in an amount sufficient to act as a binding agent;

wherein the relative amounts of rice starch and carob-bean flour to provide a weight ratio of rice starch to carob-bean flour of between about 2.5:1 and about 5:1.

39. The method of claim 38 wherein the amount of rice starch is between about 1.5 and 2.5 weight percent of the overall composition and the amount of carob-bean flour is between about 0.3 and 1 weight percent of the overall composition.

* * * * *